United States Patent [19]

Larkey

[11] Patent Number: 5,127,055
[45] Date of Patent: Jun. 30, 1992

[54] SPEECH RECOGNITION APPARATUS & METHOD HAVING DYNAMIC REFERENCE PATTERN ADAPTATION

[75] Inventor: Leah S. Larkey, Leverett, Mass.

[73] Assignee: Kurzweil Applied Intelligence, Inc., Waltham, Mass.

[21] Appl. No.: 653,988

[22] Filed: Feb. 11, 1991

Related U.S. Application Data

[63] Continuation of Ser. No. 292,303, Dec. 30, 1988, abandoned.

[51] Int. Cl.⁵ .................................. G10L 5/00
[52] U.S. Cl. ........................................... 381/43
[58] Field of Search ................................ 381/41–43; 364/513.5

[56] References Cited

U.S. PATENT DOCUMENTS

| | | | |
|---|---|---|---|
| 3,631,520 | 12/1971 | Atal | 179/1 SA |
| 3,909,533 | 9/1975 | Willimann | 179/1 SA |
| 4,087,630 | 5/1978 | Browning et al. | 179/1 SD |
| 4,509,133 | 4/1985 | Monbaron et al. | 364/513.5 |
| 4,590,604 | 5/1986 | Feilchenfeld | 381/42 |
| 4,618,984 | 10/1986 | Das | 381/43 |
| 4,783,803 | 11/1988 | Baker et al. | 381/43 |

Primary Examiner—Emanuel S. Kemeny
Attorney, Agent, or Firm—Hale and Dorr

[57] ABSTRACT

A speech recognition apparatus having reference pattern adaptation stores a plurality of reference patterns representing speech to be recognized, each stored reference pattern having associated therewith a quality value representing the effectiveness of that pattern for recognizing an incoming speech utterance. The method and apparatus provide user correction actions representing the accuracy of a speech recognition, dynamically, during the recognition of unknown incoming speech utterances and after training of the system. The quality values are updated, during the speech recognition process, for at least a portion of those reference patterns used during the speech recognition process. Reference patterns having low quality values, indicative of either inaccurate representation of the unknown speech or non-use, can be deleted so long as the reference pattern is not needed, for example, where the reference pattern is the last instance of a known word or phrase. Various methods and apparatus are provided for determining when reference patterns can be deleted or added, to the reference memory, and when the scores or values associated with a reference pattern should be increased or decreased to represent the "goodness" of the reference pattern in recognizing speech.

20 Claims, 9 Drawing Sheets 5,127,055

SPEECH RECOGNITION APPARATUS & METHOD HAVING DYNAMIC REFERENCE PATTERN ADAPTATION

This is continuation of copending application(s) Ser. No. 07/292,303 filed on Dec. 30, 1988, abandoned.

BACKGROUND OF THE INVENTION

The invention relates generally to speech recognition apparatus and methods, and in particular, to a speech recognition apparatus and method for modifying the content of the set of stored representations, the reference patterns, of words of phrases to be recognized.

In the field of speech recognition, many different methods have been described for improving the utterance representing reference patterns against which speech recognition is to be made. These reference patterns are typically created during a training session, prior to actual recognition of unknown incoming speech, and the resulting patterns are stored in a reference pattern memory and represent ether an entire word or phrase or portions of a word to be recognized.

According to most speech recognition methods, the reference patterns, once calculated and stored, remain immutable unless a new "off-line" training session is undertaken to update the reference patterns, for example in response to a new recognition environment, new equipment, or in the extreme a new speaker. In general, these speech recognition systems do not provide a method for updating the stored reference patterns during the recognition of unknown speech with regard to the words or phrases to be recognized. (Recognition system have provided an update on a silence representing reference pattern by recognizing the period between actual speech utterances, and providing an updated version of that silence reference pattern. These systems, however, have not provided updated reference patterns for the stored reference patterns representing actual speech.) Thus, in particular, inexperienced users often speak in a different manner during the training phase than they do later when they are using the speech recognizer in an application to accomplish some task. It is well known that the best recognition results come from training which manages to induce the users to speak the way that they will speak in using the product. This is difficult to do and most recognition systems do not achieve these "best results."

Accordingly, a primary object of the invention is to improve the recognition accuracy in a speech recognition environment. Other objects of the invention are a dynamic reference pattern updating mechanism for improving the precision with which incoming unknown speech can be identified, and providing reference patterns which better characterize a speaker's manner of pronouncing a selected word vocabulary.

A further object of the invention is to provide more "training" data during actual recognition sessions and selectively accumulate more data on the items which most need improvement, that is, those items on which the system is making errors.

SUMMARY OF THE INVENTION

The invention relates to a speech recognition method and apparatus having dynamic reference pattern adaptation. The method features the steps of storing a plurality of reference patterns representing speech utterances in memory. Each reference pattern has associated therewith a quality value representing the effectiveness of that pattern for recognizing an incoming speech utterance. The method further features providing correction actions from The user of the application with which the recognition method is employed. Such correction actions represent the accuracy of a speech recognition decision made by the speech recognition method during the recognition of unknown incoming speech utterances, and according to the method, provides dynamic reference pattern adaptation after that training of the speech recognition system which initially sets up the reference pattern statistics. The quality values are updated during speech recognition for at least a portion of those reference patterns used during the speech recognition process.

The updating step further features increasing the quality value of those reference patterns associated with a correct identification of an incoming speech utterance and decreasing the quality value of those reference patterns associated with an incorrect identification of an incoming speech utterance. Reference patterns having a low quality value can be deleted under certain circumstances, in particular when a predetermined number of stored reference patterns is accumulated or the quality score falls sufficiently low. The method also features dynamically adding new reference patterns to the stored reference patterns during this speech recognition process in response to the recognition correction actions and providing such additional reference patterns for use in recognizing new unknown speech input utterances.

In a specific aspect of the invention, the method further features the steps of associating with each unknown incoming speech utterance a recognition event record. Each record contains at least an identification of a best candidate matching the associated utterance, and an updateable identification of alternative candidates matching the utterance. The record further features an updateable identification of the particular method used for reaching the correct answer. Such methods may include, for example, the speech recognition apparatus user correction actions, or the use of syntax rules. The method also identifies the recognition event record for each recognized utterance which is provided to a speech application.

In other aspects of the invention, the method features identifying intruder reference patterns, decreasing the quality value of an intruder pattern, and deleting the intruder pattern should its quality value be less than a selected threshold. In another aspect, the updating step features identifying contributor reference patterns, increasing their quality scores, and compressing the quality values of all reference patterns if the value of the largest quality value associated with the reference pattern exceeds a second selected threshold.

The speech recognition apparatus according to the invention features circuitry for storing a plurality of reference patterns, the patterns representing speech to be recognized, with each reference pattern having associated therewith a quality value representing the effectiveness of that pattern for recognizing an incoming speech utterance. Further circuit elements provide correction actions representing the accuracy of a speech recognition decision. The correction actions are provided during the recognition of an unknown incoming speech utterance and after the training of the system. The system further features circuitry for updating the quality of values during the speech recognition for at least a portion of those reference patterns used during the speech recognition process.

The apparatus further features elements for increasing and decreasing the quality values of reference patterns associated respectively with a correct or incorrect identification of an incoming speech utterance. Typically the increased quality value is associated with a contributor reference pattern while a decreased quality value is associated with an intruder reference pattern. Reference patterns having low quality values, or quality values less than a selected threshold, can be deleted unless required for identification of a particular word or utterance.

In addition, circuitry is provided for adding additional reference patterns to the reference pattern storage during the speech recognition process if, in response to correction actions are such additional reference patterns are advantageously available for recognizing the unknown speech input utterances.

The apparatus further includes a recognition event database storing a plurality of recognition event records. Each recognition event record is associated with an incoming unknown speech utterance and contains at least an identification of a best candidate matching the utterance, alternative candidates matching the utterance, and an updateable identification of the method used to reach the correct answer (in particular if correction actions area available). Circuitry for identifying the recognition event record for each recognized utterance provided to a speech application using the utterance is also available.

BRIEF DESCRIPTION OF THE DRAWINGS

Other objects, features, and advantages of the invention will be apparent from the following description of a particular preferred embodiment taken together with the drawings in which.

DESCRIPTION OF A PREFERRED EMBODIMENT

Figure 1:
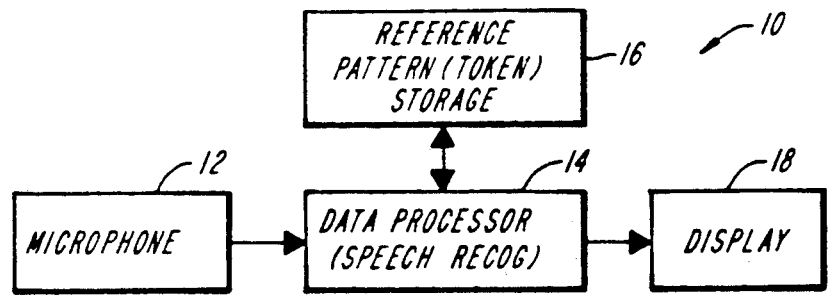
FIG. 1 illustrates, generally, an apparatus in accordance with the preferred embodiment of the invention for effecting speech recognition.

Referring to FIG. 1, a speech recognition apparatus 10 has a speech input mechanism, for example a microphone 12, which provides input speech electrical signals to a data processing unit 14. The data processing unit digitizes, processes and analyzes the incoming speech and compares the incoming speech to reference patterns stored in a reference pattern storage memory 16. The data processing system then makes a best estimate of the identity of the incoming speech and provides electrical signals identifying the best estimate to an output device such as a display terminal 18. The data processing system can operate in accordance with the speech recognition system described in Feldman et al. U.S. patent application Ser. No. 749,582, filed Jun. 22, 1985, now U.S. Pat. No. 4,799,262 issued Jan. 17, 1989, which is incorporated herein by reference.

In accordance with the invention, each reference pattern stored in memory 16 represents either all or a portion of a word or phrase. There may be one or several reference patterns (in essence, different variants) which correspond to the same word or phrase.

In accordance with the preferred embodiment of the invention, the stored reference patterns are dynamically updated and adapted according to the incoming speech by examining the intermediate stages and results of recognition, using correction actions which the user has provided about the correctness of the recognition. Based upon the available information, the apparatus determines whether to add new tokens, delete old reference patterns, or change the quality score associated with a stored reference pattern (this modifies the likelihood that a reference pattern will be deleted in the future). The apparatus stores the intermediate stage results of the recognition process in a so-called "recognition event database." User correction actions, in the illustrated embodiment of the invention, are provided by the particular application in which the speech recognition process is employed.

The error correcting correction actions from the user are critical to successful operation of the reference pattern adaptation method according to the invention. User correction actions are typically provided by an application which can display alternative candidates to the best candidate when a word is recognized. This allows the user to correct errors by deleting an otherwise best recognition estimate by the data processing system, and to select instead a generally lower scoring choice to correctly represent the incoming speech. In this manner, data can be collected during actual speech recognition which enables the dynamic updating of the reference patterns stored in memory 16 and which thereby enables the recognition system to be more precise and accurate in the recognition process.

Figure 2:
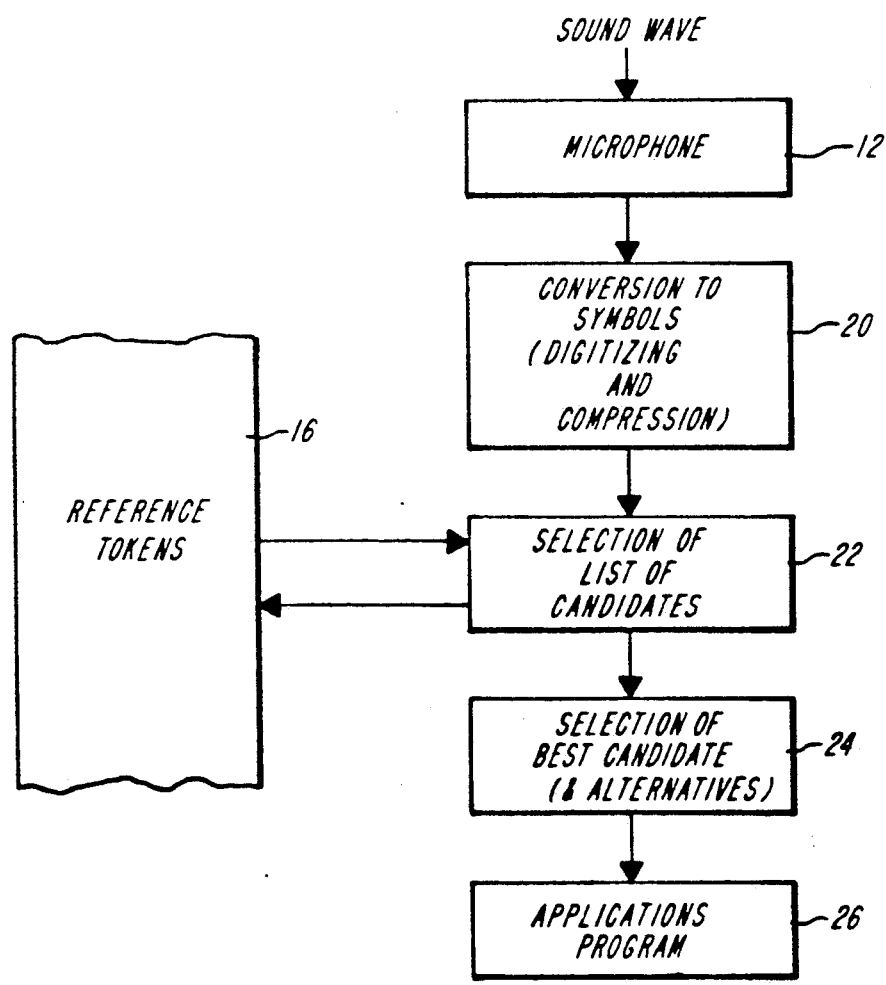
FIG. 2 is a flow chart representing operation of a generalized speech recognition system in accordance with known applied principles of recognition.

Referring to FIG. 2, a typical speech recognition process takes place in three stages. In the first stage, a sound wave is converted by microphone 12 into electrical signals which are converted in processor 14 from analog to digital signals, for example, using an analog-to-digital converter. This step is indicated at 20. The data are also compressed at 20 to yield a smaller set of symbols than was originally output by the analog-to-digital converter. The symbols are grouped into speech input reference pattern representations, and are compared, at 22, with the set of stored reference patterns, stored at 16. Based upon the comparison process, one or more potential candidate words are then selected and passed to a selection method at 24. The selected word may simply be the item among the candidates which is the closest to the input utterance according to some distance function, or additional processing may be employed incorporating linguistic or other statistical information which may reorder the choices and put a different "best" choice at the top of the list. Finally, an ordered list is provided with the best candidate recognition word and several alternatives being provided to an applications program at 26.

Figure 3:
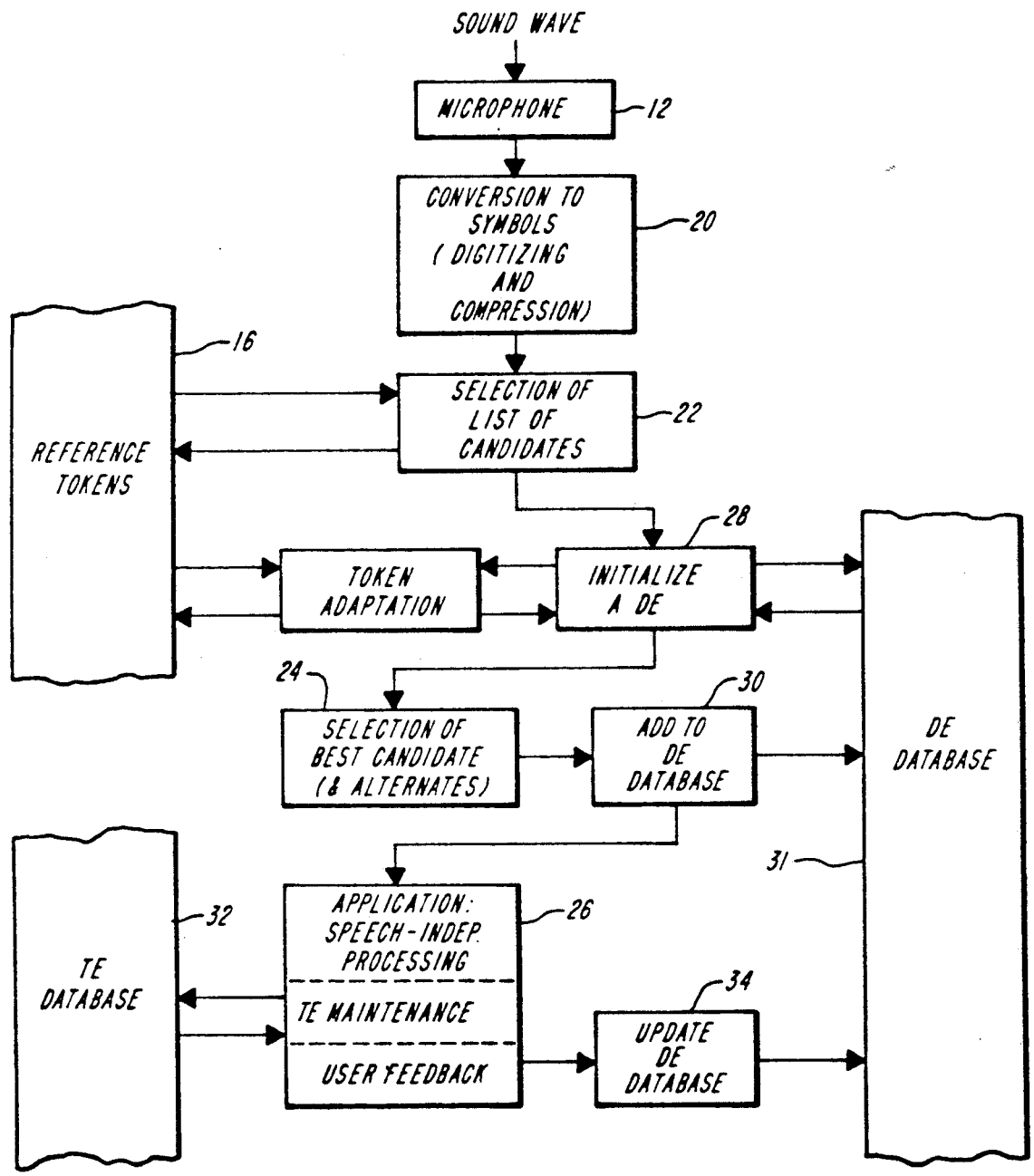
FIG. 3 is a flow chart representing general operation of a speech recognition system in accordance with a preferred embodiment of the invention.

Referring now to FIG. 3, in accordance with a preferred embodiment of the invention, the results of analyzing a word or phrase utterance, called a "recognition event," using the probability based selection process at 22, while being provided to the selection process at 24, are first employed to initialize, at 28, a database record for the utterance. This.. database record is called a "recognition event database record" ("RE record" for short). The recognition event record provides information about the intermediate results of the recognition process for that recognition event. Storing this information allows a reference pattern adaptation method to operate a substantial time delay after the occurrence of the recognition event, giving the user the opportunity to correct recognition errors before an item is used for adaptation.

The recognition apparatus then continues in accordance with the illustrated embodiment of FIG. 2, to select, at 24, the best recognition candidate, and preferably, a list of alternate candidates should the best candidate prove to be incorrect. The best candidate and the alternates are stored, at 30, as a recognition event record, initialized for this utterance in a recognition event database 31. The information added to the database includes the identification of the best candidate (that is, the correct answer), the alternates, and a correction mode field which indicates that the correct answer was provided by the recognition process without correction actions from the user application. The best candidate and the alternates are then passed, at 26, by the recognition apparatus to the applications program which, for example, displays the best candidate and the alternates to the user for confirmation. In addition, the applications program will maintain a text event database 32 (as described in detail below) and, as necessary, update, at 34, the recognition event database in response to user correction action. The recognition event database can be updated, for example, if the user selects an alternate as the correct answer.

Figure 4:
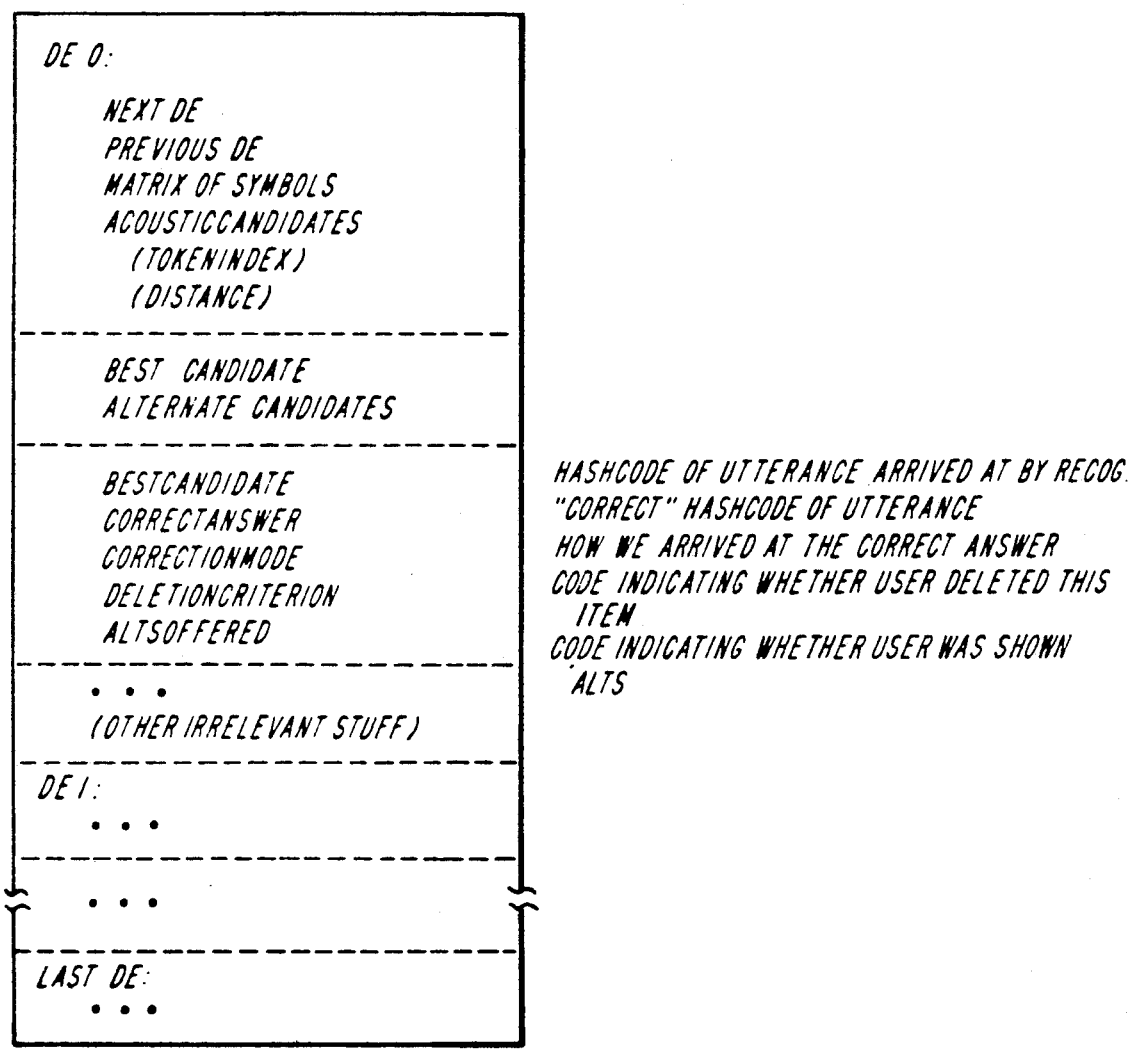
FIG. 4 is a table description of the data stored for representing a recognition event.

Referring to FIG. 4, the recognition event database has a plurality of recognition event file records, each containing substantial information about the intermediate results of the speech recognition process. A recognition event record is created or initialized for each utterance of the speaker. Information is placed into the recognition event record, for example, when the utterance is initially recognized (at 28, FIG. 3), when the best candidate and the alternates are selected (at 30. FIG. 3), and can, as noted above, be updated later (at 34, FIG. 3) as a result of correction actions, including later utterances, from the user. User feedback may result from later utterances, such as "delete", or from other verbal commands, movement of the screen text cursor, or the choice of an alternative candidate from a displayed list of alternate candidates.

In accordance with the illustrated embodiment of the invention, the recognition event records are temporary and remain available only for a short period of time. The time duration of that availability depends upon the speech recognition activity in the system because only a limited quantity of storage is available. The recognition event records are therefore reused and the system must maintain not only a list of the recognition event records, but also a list which indicates when a particular recognition event record is free or empty, or else is in use. In an alternative embodiment of the invention, recognition event records could be maintained permanently in some instances if storage were available.

Each illustrated recognition event database record contains at least the following data elements:

(1) Next RE—a pointer to the recognition event record for the utterance following the current recognition event utterance (or NULL if this is the last recognition event of a sequence).

(2) Previous RE—a pointer to the recognition event record for the utterance prior to the present recognition event utterance (or NULL if there is no previous recognition event).

(3) Matrix of Symbols—the symbols that make up the utterance being recognized. This can be the digitized representation of the waveform or, in the illustrated embodiment, a compressed representation of the input waveform (unknown input reference pattern representation) which will then be matched against those representations stored in the reference pattern set memory.

(4) Acoustic Candidates—a list of those candidates, output at 22 (FIG. 3), during the selection of possible candidates by the speech recognizer. Each candidate is represented by its index (or pointer) into a reference pattern set. In addition, the distance (score) between the input utterance and a particular candidate is also stored. There can be more than one candidate (or reference pattern) for the same "hashcode" (a code value identifying the word or phrase of which the reference pattern is an example) in the list.

(5) Best Candidate selected the "hashcode" of the utterance by the apparatus during the best candidate selection step, at 24 (FIG. 3).

(6) Alternate Candidates—an ordered list of "hashcodes" of utterances which were close to but did not have as good a score as the selected Best Candidate.

(7) Correct Answer—A "hashcode" initially the same as the "hashcode" for the Best Candidate, but which, if the application or the user makes a correction, is changed to the "hashcode" corresponding to the utterance which the application or user selects.

(8) Correction Mode—this is a code value indicating the method by which the Correct Answer was determined. Initially, in the illustrated embodiment, the code corresponds to the coincidence between the Correct Answer and the Best Candidate. If an update is provided, the Correction Mode value is set to indicate the method by which the Correct Answer was generated, for example, by the so-called "taken" command (described below). (If the most likely candidate corresponds to an utterance which is illegal in a given context or grammar, the Correct Answer may have been selected as the second best choice after the illegal choice had been removed, and the Correction Mode value will represent this candidate generation approach.)

(9) Deletion Criterion—a code value indicating the status of a recognition event record at the time it is to be deleted. The code value can represent that the user explicitly deleted the utterance corresponding to this recognition event record; that the user explicitly accepted the utterance (for example by printing the document); or that the user implicitly accepted the utterance by not deleting it before it was "reference pattern adapted" (as described below).

(10) Alternates Offered—a code value indicating whether the recognition event record represents an utterance for which alternate candidates were displayed to the user. For example, in the illustrated embodiment, alternates are provided when speech text is recognized but not when a speech command is recognized.

As noted above, the applications program can initiate and update, at 26, the text event database 32. The text event database, which is similar to the recognition event database, stores text event records corresponding to entities (for example, words or phrases) on the display screen. Some text events correspond to spoken utterances which are also represented in the recognition event database.

Figure 5:
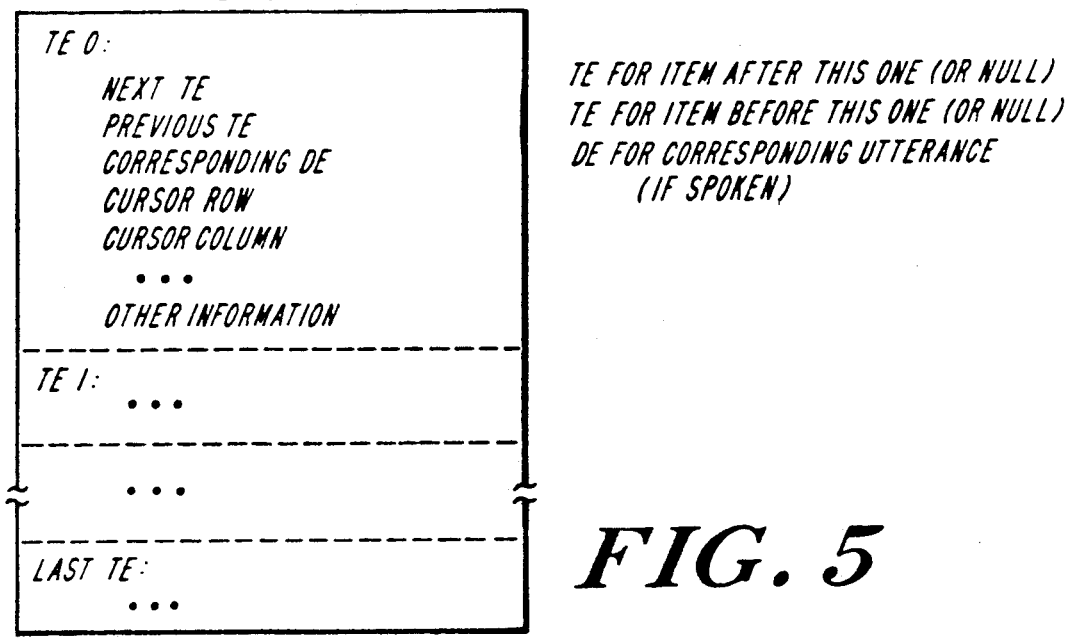
FIG. 5 is a table description of the data stored for describing a text event.

In the illustrated embodiment of the invention, a text event record is created for each utterance that affects the placement of text on the display screen. Therefore spoken commands do not result in the creation of a text event record. If a text event record is created for a spoken utterance (as opposed to a typed word), the record contains an identifier indicating the recognition event record with which it is associated. Referring to FIG. 5, in the illustrated embodiment, each text event record in the text event database contains the following data elements:

(1) Next TE—a pointer to the text event record for the text following the current text event (or NULL if this is the last text event).

(2) Previous TE—a pointer to the text event record for the text prior to the current text event (or NULL if there is no text event prior to the current event).

(3) Corresponding Recognition Event—an index or pointer to the recognition event record, if any, which corresponds to this text event record.

(4) Cursor Row—the row on the display screen where the text corresponding to this text event record begins.

(5) Cursor Column—the column on the display screen at which the text corresponding to this text event record begins.

In the text event database of the illustrated embodiment, the text events are represented as an ordered one-dimensional set, that is, a simple list of items, rather than the two-dimensional spatial array which appears on the screen. This version of reference pattern adaptation therefore only takes into account cursor movement commands which move forward or backward word by word.

Figure 6:
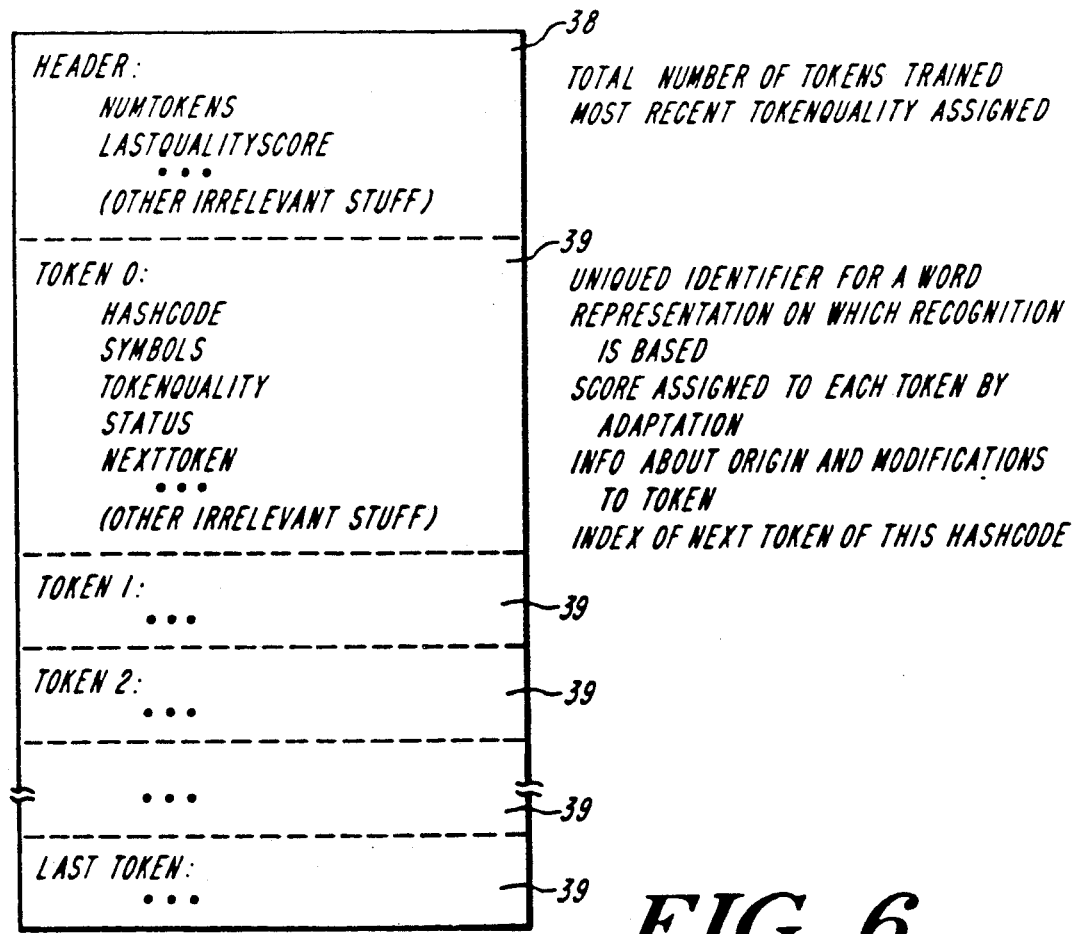
FIG. 6 is a table description of the data stored for describing a reference pattern set.

Referring now to FIG. 6, the memory of the apparatus stores the reference pattern as reference pattern set records in a reference pattern set database. The reference pattern set data are items against which the input speech will be compared. Each record represents a "reference pattern." In the speech recognition process, pattern matching algorithms which define a distance function representing how similar an input reference pattern (representing an input utterance) is from a stored reference pattern provide the scores from which the Best Candidates and Alternate Candidates will be selected.

Each reference pattern set record has a header 38 which contains, in the illustrated embodiment, at least two parameters which apply to the entire set of reference patterns. The header parameters are: NumReference Patterns, the number of reference patterns in the set of reference patterns; and LastQualityScore which is the Reference Pattern Quality Score most recently assigned to any reference pattern in the set.

Following the header 38, are the reference pattern records 39. Each reference pattern record 39 contains the following data items:

(1) Hashcode—a unique identifier for the word or phrase of which the reference pattern is an example.

(2) Symbols—an identification of the representations upon which element recognition is based. That is, each reference pattern is made up of an ordered set of symbols and when an unknown speech input is compared to a reference pattern, the pattern matching method compares the ordered plurality of symbols representing the unknown speech with the ordered set of symbols making up the reference pattern.

(3) Reference Quality Score—a measure of "goodness" which reflects a reference pattern's performance over time. Reference Pattern Quality is a measure which recognizes both the age of the reference pattern and its contribution to the recognition process. A high Reference Pattern Quality Score means either that the reference pattern was added recently or that it recently made a positive contribution to recognition. A low Reference Pattern Quality Score means either that a reference pattern has not contributed to recognition for a long time or it has caused an error in recognizing an input speech utterance. The Reference Pattern Quality, in accordance with the illustrated embodiment, is employed to determine which reference patterns should be deleted from the reference pattern set database.

(4) Status—a measure which indicates whether a reference pattern has been marked for deletion.

(5) Next Reference Pattern—a pointer or index to the next reference pattern, if any, having the same hashcode.

Figure 9:
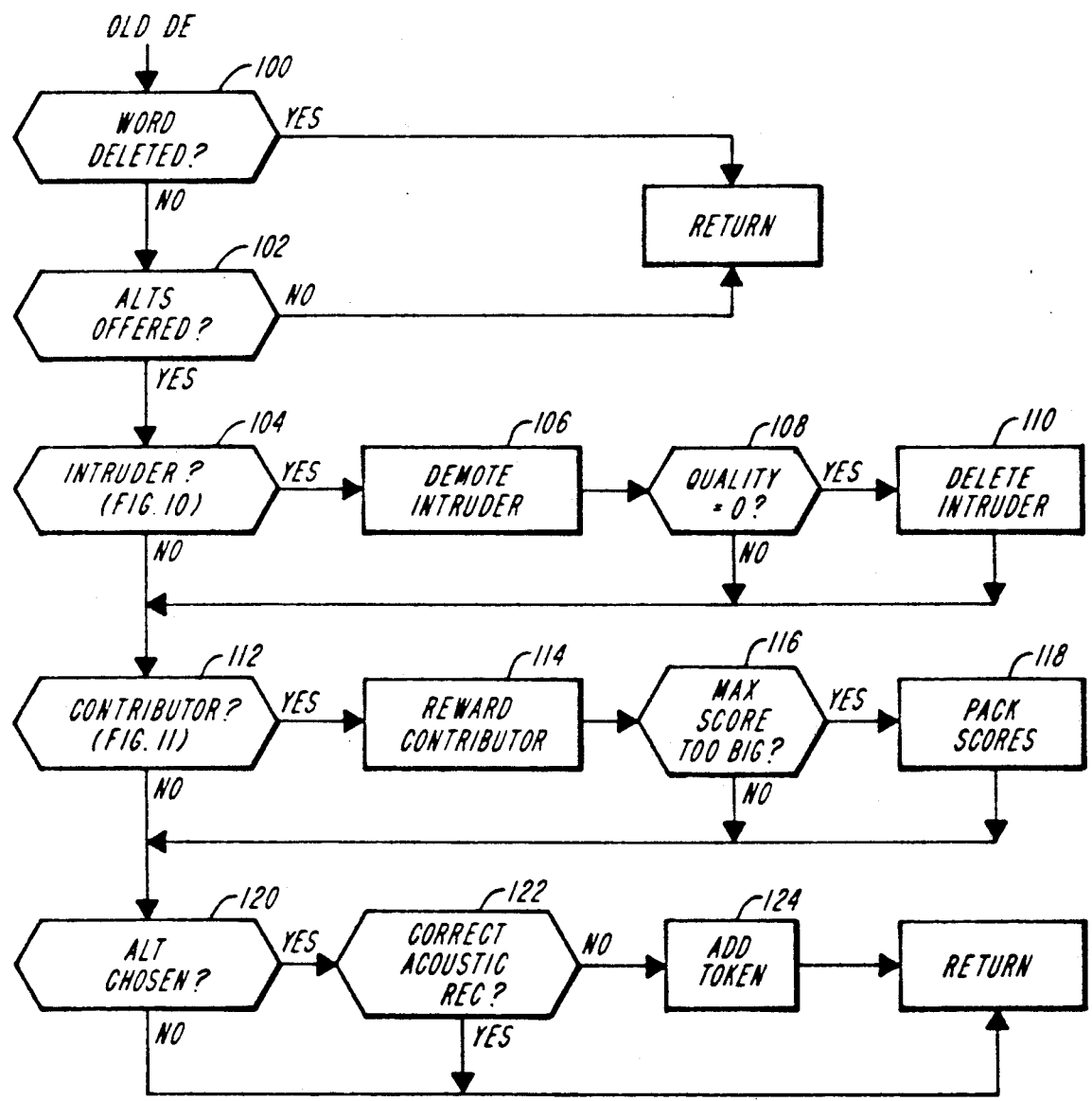
FIG. 9 is a flow chart description of the reference pattern adaptation method in accordance with a preferred embodiment of the invention.

In accordance with the illustrated embodiment of the invention, a recognition event record initialization controls the timing for reference pattern adaptation (as described below). A recognition event is considered old enough to adapt when it is the oldest recognition event record left in the recognition event database, the recognition event database is otherwise full, and a recognition event record needs to be freed up to store the information resulting from a new utterance. The content of a recognition event record is used to effect reference pattern adaptation just prior to the time that the record is freed up (or deleted) to make room for the recognition event data representing a new utterance. It is also important to note that different criteria can be employed to determine whether a recognition event record is old enough to "adapt" (that is, whether reference pattern adaptation as illustrated in FIG. 9 is to be performed using the contents of the recognition event record). And, if the recognition event records were stored permanently, one could adapt the recognition event record after a preselected threshold number of subsequent words had been recognized.

Figure 7:
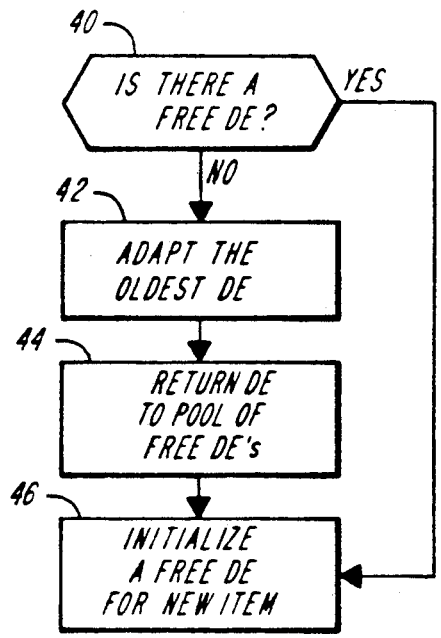
FIG. 7 is a flow chart description for initializing a database record representing a new recognition event.

Referring to FIG. 7, when a new recognition event record needs to be initialized, the recognition system first determines, at 40, whether there is an available recognition event record. If not, the oldest recognition event record is "adapted" at 42. The record location is then freed at 44 and that memory space is used at 46 for the new recognition event record for an utterance which has just been received for recognition by the system. (When a recognition event record is first initialized, as indicated at step 28 of FIG. 3, the NextDE, PreviousDE, Symbols, and Acoustic Candidates fields are initialized. The remaining fields are filled after further processing.)

In a typical application, the speech recognition process is adapted to place text on a screen display which the speaker or user, can view. The user, then, can provide either additional new speech utterances or correcting speech which represents correction actions information (including commands to the system to select further functions). Generally, in the illustrated embodiment, the application has functions which can be divided into three categories. A first function is independent of the recognition of speech. For example, if the recognition processor is working with a word processor or text editor, this portion of the application performs exactly what any computer based text editor or word processor does; that is, it takes input from the user, displays it on the screen and maintains a cursor showing the current active position in the document. The application, in this mode, also interprets and carries out commands from the user which cause the cursor to move or the screen text to be modified. Except for the fact that the input comes from a speech recognizer as opposed to a keyboard input, this method of processing is well known to those in the computer field.

The second set of functions carried out by the applications program includes maintaining the association between the text on the screen and the text event records in the text event database. The third set of functions carried out by the application is to respond to the user's corrections and/or changes (user correction action). This third set of functions includes the steps of displaying alternate recognition candidates on the display screen and processing the commands, which cause changes to be made, to existing recognition event and/or text event records. Thus, during operation of the application, there is a cursor on the screen to indicate the active position in the document, and correspondingly, an "ActiveTE" value designates the text event record which corresponds to the item in the document at which the screen cursor is located. When the user issues a command which causes a deletion of text or a cursor movement, the application processing system maintains a record of which text event record becomes the new "ActiveTE," and further, keeps track of whether the current cursor lotion has a corresponding recognition event record. When a deletion command, or a so-called "take-n" command is processed, the illustrated system causes information to be added to or changed in the recognition event record corresponding to the changed text event. In particular, if the user deletes a word, the recognition event for the original utterance of that word will be tagged to show that the user deleted it. If the user chooses an alternative candidate with the "take-n" command, the "CorrectAnswer" entry for the corresponding recognition event of the original utterance of that utterance will be updated.

Figure 8:
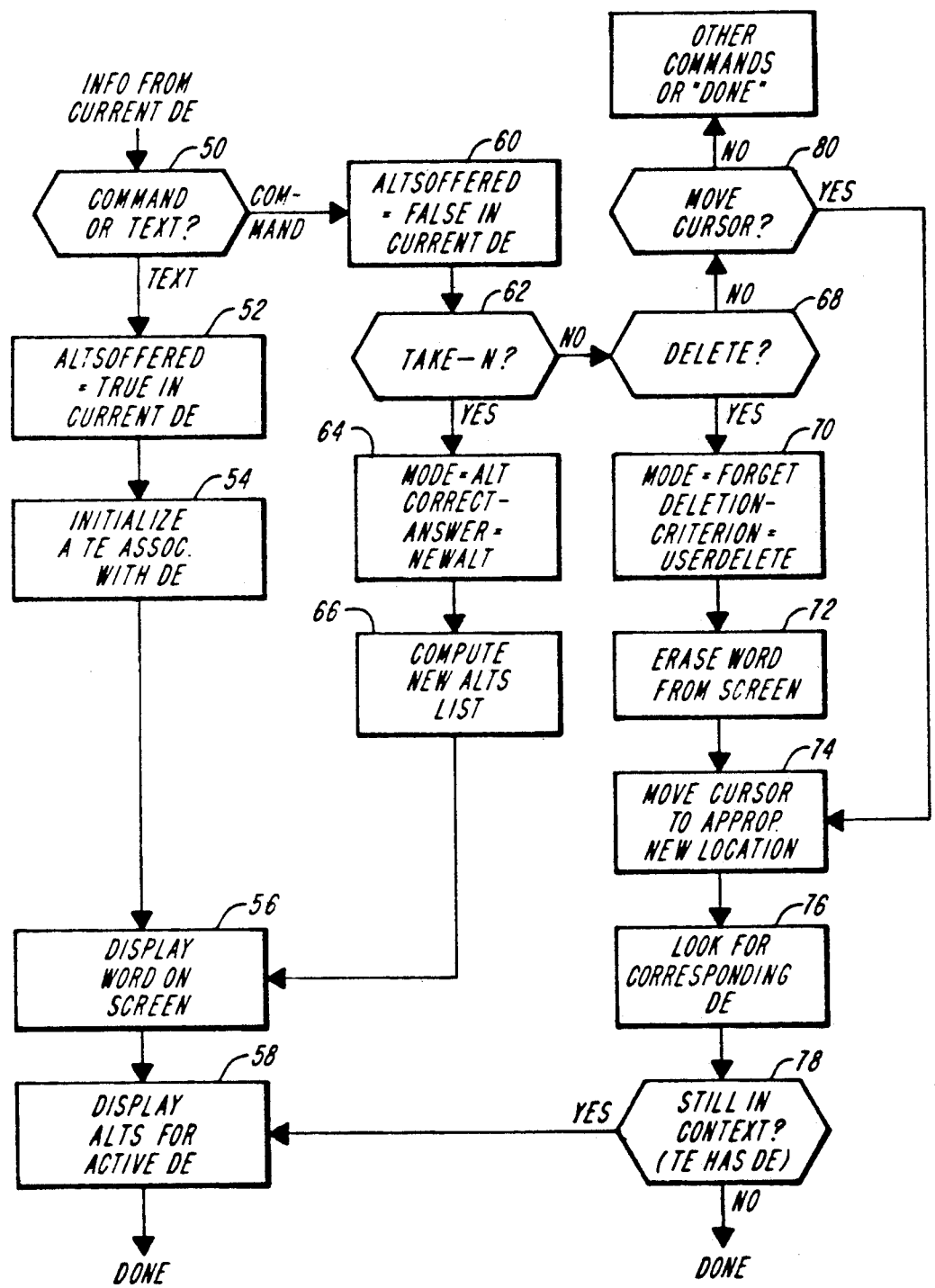
FIG. 8 is a flow chart description of a typical application employing the speech recognition apparatus of FIG. 3.

Referring to FIG. 8, in an illustrated embodiment of the invention, the application process proceeds as follows. (For simplification of description, the cursor movement is limited to movement forward or backward one word, and the deletion command is limited to deletion of the present or current word. In most systems, however, there would be other movement commands for the cursor and expanded commands relating, for example, to deletion of a sequence of words.)

In operation, the recognition data from the speech recognizer are passed to the application program and, at 50, are examined to determine whether the recognized speech utterance is a command or text. If the utterance is text, the AltsOffered field in the current recognition event record is marked, at 52, as "true," because in this application alternates are displayed, and a text event record is created at 54 for this instance of text. The text event record includes information identifying the previous text event record and the recognition event record with which it is associated. The recognized text is then entered into the speech independent section of the application program, that is, the section which performs the same function, for example, to display the text (at 56) on the display screen, independent of whether the text originated from the keyboard or from the speech recognizer. Similarly, for this illustrated application, at 58, the alternatives are displayed on the screen and are labeled from 1 through n, for example 1 through 5. This procedure enables a user to say "take-n" (n being the alternative to be selected) if the recognition has been incorrect and the nth alternative is correct.

If, at 50, the utterance had been a command, it is assumed that the command was either a "take-n" command, a "delete" command, or a "cursor movement" command. (Other commands not affecting the adaptation process (for example, "upper case next word") can also be recognized and carried out.) For commands, the AltsOffered field in the corresponding recognition event is marked, at 60, as "false," because commands are implemented immediately rather than being displayed on the screen, and because the user thus has no opportunity to correct the command with a "take-n" command or a "deletion" command. A text event record is not created for this item. If the command was a "take-n" command, as indicated by the "yes" branch from decision block 62, the recognition event record associated with the current text event record is, if available, updated. (Note that the current recognition event record is associated with the "take-n" command but that the current text event record is associated with the last event which placed text on the screen and accordingly is associated with a previous recognition event record.) If no recognition event record is found for the current text event record, the command is ignored since the alternates are not available. If, however, the associated recognition event record is available, the value of "CorrectAnswer" in that recognition event record is changed to the alternative that the user has selected to replace the selection which the recognizer originally chose, that is the Best Candidate, and the Correction Mode is set to a value that indicates that the user chose the answer with a "take-n" command. This is noted at 64. A new alternatives list is also generated, at 66, from the recognition event record. The new alternatives list contains the old alternatives with the newly selected alternative being replaced with the old Best Candidate.

The screen display is then updated at 56 so that the old text on the screen is replaced with the new correct answer, and the new alternatives list is displayed as noted at 58.

If the command was a "delete" command, as indicated by the "yes" branch from a decision block 68, the system searches the recognition event database for the dictation event record associated with the current text event record. If a record is found, the Correction Mode is set, at 70, to "FORGET," which indicates that the correct answer for that recognition event record cannot be determined; and the Deletion Criterion field in the recognition event record is set to USERDELETE. Regardless of the existence of the associated recognition event, the text on the screen corresponding to the current text event record is erased, at 72. The previous text event record then corresponds to the current text event and the screen cursor is moved to the previous text unit. This is indicated at 74. If the new current text event record has a recognition event record associated with it, the search being indicated at 76, 78, the alternatives for that text utterance are displayed on the screen as indicated at 58. Otherwise the application is finished for the present speech utterance data.

If the command were a "back one word" command as indicated by the "yes" branch from a decision block 80, the cursor is moved, at 74, to the appropriate previous text location. The text event record associated with this location has a corresponding recognition event, the recognition event record is found, at 76. If the text event and recognition event are in context, as indicated by the "yes" branch from decision block 78, the alternatives are displayed as indicated at 58. The application then proceeds to the next recognition event.

Referring now to FIG. 9, the reference pattern adaptation method operates in response to corrections in the recognition event records. The corrections can be made by the applications program, and in particular, by the user. The primary function of reference pattern adaptation is to decide when to add new reference patterns representing an old "text unit," and when to delete old reference patterns from the reference pattern memory 16. To make these decisions, the reference pattern adaptation method maintains a Reference Pattern Quality Score, noted above, in association with each reference pattern record. The Reference Pattern Quality Score for the reference patterns which have been involved in recognizing an utterance, are updated when the recognition event corresponding to that utterance is processed by the reference pattern adaptation method. FIG. 9 represents the sequence of steps that are carried out when a recognition event record is "adapted."

Initially, selected conditions must be met before an utterance or speech item is considered for adaptation. In particular, if an item is deleted by the user, it is not further processed because there is no information whether the deletion was due to an incorrect recognition or because the user decided to say something different. This corresponds to the "yes" branch from the Word Deleted decision block 100. If alternatives were not displayed for an item, for example alternatives are not displayed for commands (which are carried out immediately), the user does not get a chance to correct the speech recognition. This corresponds to the "no" branch of the Alternatives Offered decision block 102.

Figure 10:
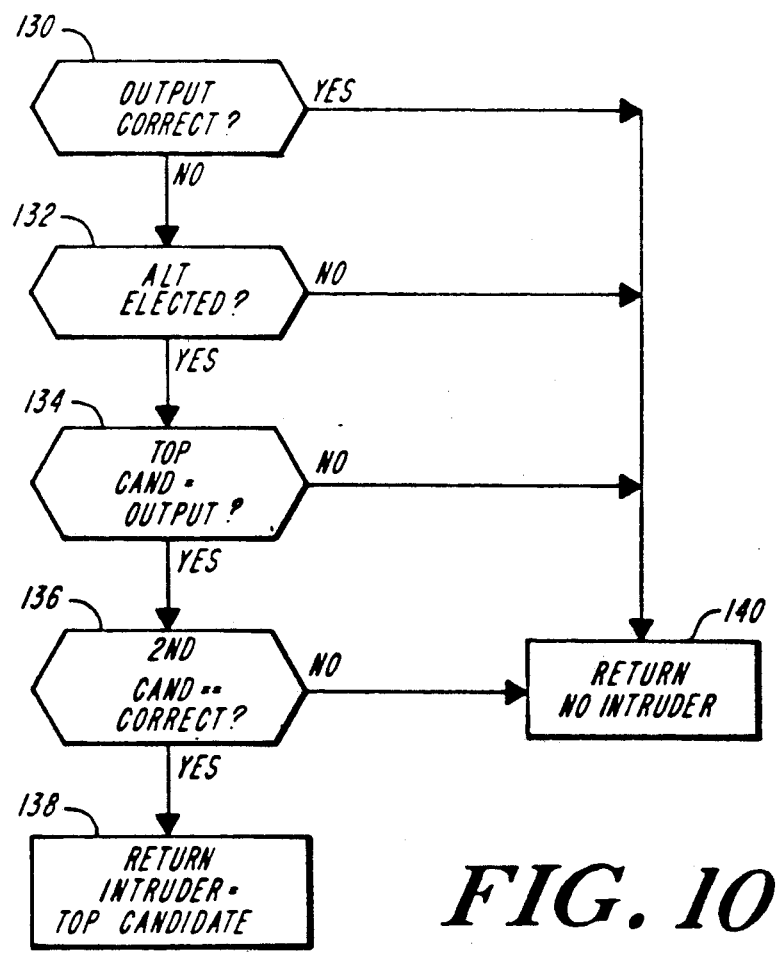
FIG. 10 is a flow chart description of a method for detecting "intruder" reference patterns according to a preferred embodiment of the invention.

If an utterance passes the conditions of decision blocks 100, 102, the recognition event record is examined to determine whether any reference patterns in the acoustic candidate list qualify as so called "intruder" reference patterns. The procedure for identifying intruder reference patterns is illustrated in FIG. 10. If there is an intruder reference pattern, the Quality Score for the intruder reference pattern is decreased at 106 by a selected amount. In the illustrated embodiment, the selected amount equals one-fourth of the maximum Reference Pattern Quality Score and is determined at the time the application begins. If the Quality Score for a reference pattern falls below zero, as indicated by the "yes" branch from a decision block 108, the intruder is deleted at 110.

The recognition event is then examined, at 112, to determine whether any reference patterns in the acoustic candidate list qualify as contributor reference patterns. The procedure for finding contributor reference patterns are described in connection with FIG. 11. If a contributor reference pattern is found, as indicated by the "yes" branch from decision block 112, the contributor is "rewarded" so that the Quality Score for that reference pattern is increased to one more than the highest Quality Score among the other reference patterns in the reference pattern set. This is indicated at 114. Each time the maximum score is incremented, a test is performed, at 116, to determine whether the value of the maximum Quality Score has approached too close to the top of the range of numbers used for storing the Reference Pattern Quality values. If the number is within 10% of the maximum (in this embodiment), the scores in all of the reference patterns are reduced by one half. This is indicated at 118. After the contributors have been sought, the recognition event record is examined, at 120, to determine whether the spoken utterance associated with that recognition event should be added as a new reference pattern. The reference pattern is added as a new reference if the user chose an alternative through the "take-on" command, as indicated at 120, and if the acoustic recognition was not correct, that is, the reference pattern at the top of the acoustic candidate list was not a reference pattern of the correct answer. This decision is made at 122. If both conditions are satisfied, the reference pattern is added, at 124, to the reference pattern set data base.

The process for classifying a reference pattern as an intruder, that is, a reference pattern whose quality score should be reduced, can be dependent upon a number of different criteria. Referring now to FIG. 10, the illustrated process for finding "intruder" reference patterns requires that the following four conditions be met. First, the output of the recognizer must have been incorrect, that is, in the recognition event record, the hashcode corresponding to the Best Candidate was not equal to the hashcode of the Correct Answer. This test is indicated at 130. Second, the user has selected an alternative; that is, in the recognition event record the Correction Mode has a value indicating that a "take-on" command was issued. This test is indicated at 132. Third, in the acoustic candidate list stored in the recognition event record, the hashcode of the best acoustic candidate is equal to the hashcode of the incorrect output (that is, the Best Candidate). This test is indicated at 134. Fourth, in the acoustic candidate list stored in the recognition event record, the hashcode of the second acoustic candidate is equal to the hashcode of the Correct Answer. This test is indicated at 136.

If all of these conditions are met, the top acoustic candidate for the recognition event record is considered an intruder reference pattern as indicated at 138. Otherwise. no intruder reference pattern is found as indicated at 140.

Figure 11:
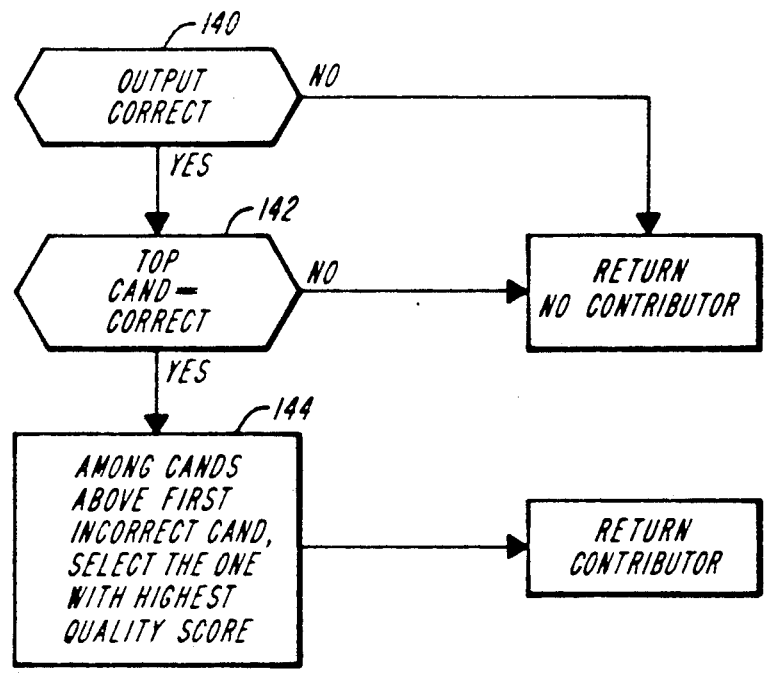
FIG. 11 is a flow chart description of a method for finding "contributor" reference patterns according to a preferred embodiment of the invention.

Referring to FIG. 11, a reference pattern will be considered a contributor reference pattern, in a recognition event, if the recognition was correct. That is, the hashcode of the Best Candidate is equal to the hashcode of the Best Answer (indicated at 140) and on the acoustic list, the top candidate must be a reference pattern of that Correct Answer (indicated at 142). The Top Candidate and any other reference patterns of the Correct Answer which are ranked above the first incorrect candidate on the acoustic candidate list are potential contributor reference patterns. (Recall that more than one reference pattern can represent the same utterance and thus correspond to the same hashcode.) Among these potential contributors, the method chooses as a contributor reference pattern the one whose Quality Score is already the highest, as indicated at 144.

Figure 12:
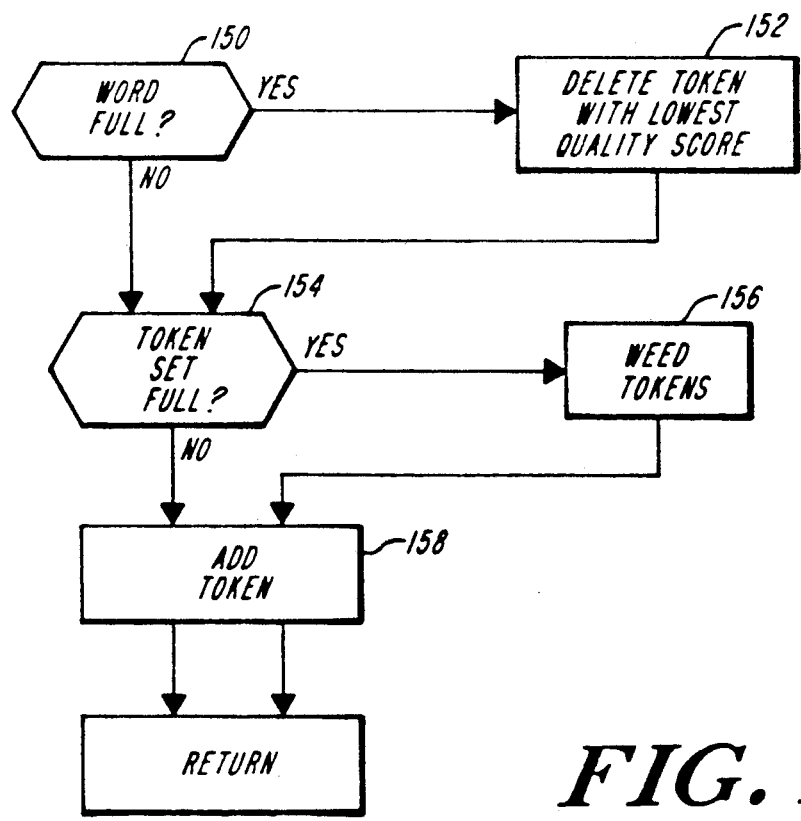
FIG. 12 is a flow chart description of a method for adding a new reference pattern to the reference pattern database according to a preferred embodiment of the invention.

Referring now to FIG. 12, prior to adding a new reference pattern to the reference pattern set, room or memory storage must be available. If a phrase or word is represented in storage by the maximum number of allowable reference patterns (that is, a word is allowed, but a fixed number of acoustic variants), one old variant must first be deleted. The test for a full set of reference patterns for an utterance is performed at 150 and if the utterance reference pattern set is full, the reference pattern with the lowest Quality Score is deleted at 152. A test is then performed, at 154, to determine if the entire reference pattern memory is full. If there is no memory available for a new reference pattern, the entire set of reference patterns must be weeded. This requires that the entire set be scanned to find a number of reference patterns (currently equal to one thousand in the illustrated embodiment), with the lowest Reference Pattern Quality Scores. These reference patterns are then deleted. This weeding process is indicated at 156. The new reference pattern is then added, at 158. The apparatus then returns to the applications program.

Figure 13:
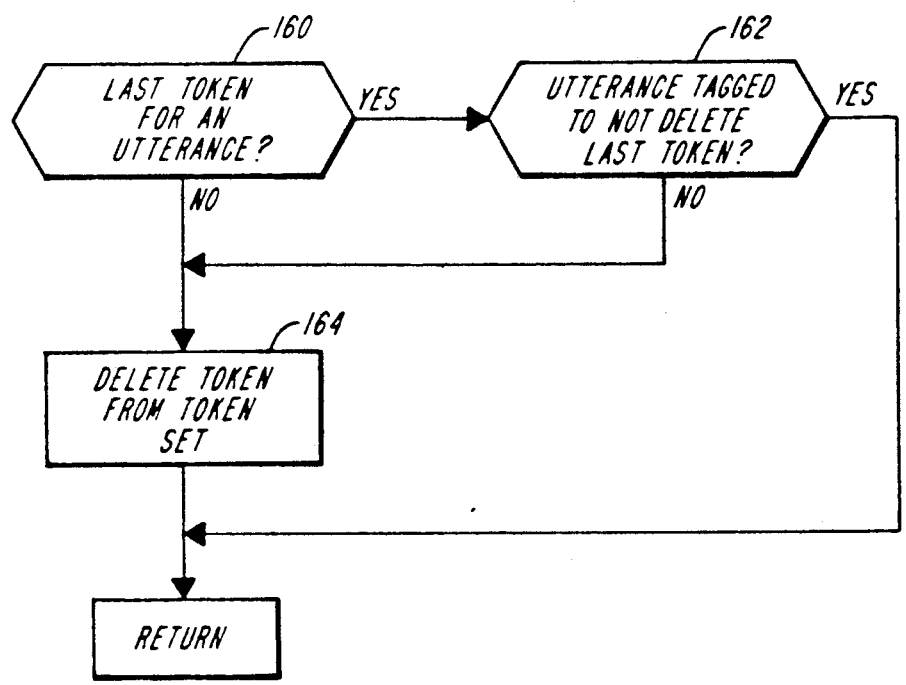
FIG. 13 is a flow chart description of a method for deleting a reference pattern from the reference pattern database in accordance with a preferred embodiment of the invention.

Referring now to FIGS. 12 and 13, before a reference pattern can be deleted, at 156, the apparatus determines, at 160, whether it is the last reference pattern representing an utterance. If it is the last reference pattern, the system checks, at 162, to determine whether the utterance has been "tagged" as an utterance whose last reference pattern cannot be deleted. If the reference pattern can be deleted, then the reference pattern set is reduced by that reference pattern, at 164, and the application returns to the calling program. If the reference pattern is "tagged", it is not deleted from the reference pattern set.

In this manner, the word representing reference patterns are being constantly reviewed and dynamically updated to provide the best representations of words to be recognized. The reference patterns with the lower or lowest Quality Scores, within the parameters set up by the recognition method, are constantly updated and weeded so that only the better reference patterns are maintained in the system. In particular, the reference patterns are updated as the utterances are used in context which tends to improve the quality of recognition based upon the tendency of the speaker to pronounce the same words somewhat differently in different speech contexts.

Additions, subtractions, deletions, and other modifications of the illustrated embodiment of the invention will be apparent to those practiced in the art and are within the scope of the following claims.

What is claimed is:

1. A speech recognition method comprising the steps of
storing a plurality of reference patterns representing speech to be recognized, storing in association with each reference pattern a quality value representing the effectiveness of that pattern for recognizing past incoming speech utterances,
providing correction actions representing the accuracy of a speech recognition during the recognition of unknown incoming speech utterances and after training of the system for improving the accuracy of the speech recognition, and
dynamically updating the quality values, during speech recognition, for at least a portion of those reference patterns used during the speech recognition process in response to said correction actions characterizing the usefulness of these reference patterns.

2. The speech recognition method of claim 1 wherein said updating step comprises the steps of
increasing the quality value of reference patterns associated with a correct identification of an incoming speech utterance, and
decreasing the quality value of reference patterns associated with an incorrect identification of an incoming utterance.

3. The speech recognition method of claim 2 wherein said storing step provides a limited storage area for reference patterns, and
further comprising the step of deleting reference patterns having low quality values associated therewith.

4. The speech recognition method of claim 1 further comprising the step of
adding new reference patterns to said stored reference patterns during said speech recognition process in response to said correction actions for providing additional reference patterns for recognizing unknown speech input utterances.

5. The speech recognition method of claim 4 further comprising the step of
deleting old reference patterns to make space for said added reference patterns.

6. The speech recognition method of claim 5 wherein said deleting step comprises the steps of
identifying a reference pattern having a minimum quality value associated therewith,
determining whether the reference pattern has a deletion-inhibiting status, and
deleting the reference pattern in the absence of said deletion-inhibiting status.

7. The method of claim 1 further comprising the steps of
associating with each unknown incoming speech utterance a recognition event record, containing information about said associated speech utterance, each said record containing at least an identification of a best candidate matching the utterance, and an updateable identification of alternative candidates matching the utterance, and an updateable identification of the method of reaching the correct candidate, and
identifying the recognition event record for each recognized utterance provided to a speech application using said recognized utterance.

8. The speech recognition method of claim 1 wherein said updating step comprises the step of identifying intruder reference patterns, decreasing the quality value of a said identified intruder reference pattern, and deleting said identified intruder reference pattern when its quality value is less than a selected threshold.

9. The speech recognition method of claim 8 wherein said updating step further comprises the steps of identifying contributor reference patterns, and compressing the quality values of all reference patterns if the value of the largest quality value exceeds a second selected threshold.

10. A speech recognition method comprising the steps of storing a plurality of reference patterns representing speech to be recognized, each reference pattern having associated therewith a quality value representing the effectiveness of that pattern for recognizing past incoming speech utterances, providing correction actions representing the accuracy of a speech recognition during the recognition of unknown incoming speech utterances and after training of the system for improving the accuracy of the speech recognition, associating with each unknown incoming speech utterance a recognition event record, containing information about said associated speech utterance, each said record containing at least an identification of a best candidate matching the utterance, and an updateable identification of alternative candidates matching the utterance, and an updateable identification of the method of reaching the correct answer, increasing the quality value, during speech recognition, of reference patterns associated with a correct identification of an incoming speech utterance, decreasing the quality value, during speech recognition, of reference patterns associated with an incorrect identification of an incoming utterance, adding new reference patterns to said stored reference patterns during said speech recognition process in response to said correction actions for providing additional reference patterns for recognizing unknown speech input utterances, identifying a reference pattern having a minimum quality value associated therewith, determining whether the identified reference pattern has a deletion-inhibiting status, and deleting the identified reference pattern in the absence of said deletion-inhibiting status.

11. A speech recognition apparatus comprising means for storing a plurality of reference patterns representing speech to be recognized, each reference pattern having associated therewith, in said storage means, a quality value representing the effectiveness of that pattern for recognizing past incoming speech utterances, means for providing correction actions representing the accuracy of a speech recognition during the recognition of an unknown incoming speech utterance, and after training of the system, said correction actions improving the accuracy of the speech recognition, and means for dynamically updating the quality values, during speech recognition and in response to the correction actions, for at least a portion of those reference patterns used during the speech recognition process.

12. The speech recognition apparatus of claim 11 wherein said updating means comprises means for increasing the quality value of reference patterns associated with a correct identification of an incoming speech utterance, and means for decreasing the quality value of reference patterns associated with an incorrect identification of an incoming utterance.

13. The speech recognition apparatus of claim 12 wherein said storing means provides a limited storage area for reference patterns, and further comprising means for deleting reference patterns having low quality values associated therewith.

14. The speech recognition apparatus of claim 11 further comprising means for adding new reference patterns to said stored reference patterns during said speech recognition process in response to said correction actions for providing additional reference patterns for recognizing unknown speech input utterances.

15. The speech recognition apparatus of claim 14 further comprising means for deleting old reference patterns to make space for said added reference patterns.

16. The speech recognition apparatus of claim 15 wherein said deleting means comprises means for identifying a reference pattern having a minimum quality value associated therewith, means for determining whether the reference pattern has a deletion-inhibiting status, and means for deleting the reference pattern in the absence of said deletion-inhibition status.

17. The apparatus of claim 11 further comprising means for associating with each unknown incoming speech utterance input a recognition event record containing information about said associated speech utterance, each said record containing at least an identification of a best candidate matching the utterance, an identification of alternative candidates matching the utterance, and an updateable identification of the method of reaching the correct candidate, and means for identifying the recognition event record for each recognized utterance provided to a speech application using said recognized utterance.

18. The speech recognition apparatus of claim 11 wherein said updating means comprises means for identifying intruder reference patterns, means for decreasing the quality value of a said identified intruder reference pattern, and means for deleting said identified intruder reference pattern when the quality value is less than a selected threshold.

19. The speech recognition apparatus of claim 18 wherein said updating means further comprises means for identifying contributor reference patterns, means for increasing the quality value of a said identified contributor reference pattern, and means for compressing the quality values of all reference patterns if the value of the largest quality value exceeds a second selected threshold.

20. A speech recognition apparatus comprising means for storing a plurality of reference patterns representing speech to be recognized, each reference pattern having associated therewith a quality value representing the effectiveness of that pattern for recognizing past incoming speech utterances, means for providing correction actions representing the accuracy of a speech recognition during the recognition of an unknown incoming speech utterance, and after training of the apparatus said correction actions improving the accuracy of the speech recognition, means for associating with each unknown incoming speech utterance input a recognition event record containing information about said associated speech utterance, each said record containing at least an identification of a best candidate matching the utterance, an identification of alternative candidates matching the utterance, and an updateable identification of the method of reaching the correct candidate, means for increasing, during speech recognition, the quality value of reference patterns associated with an incorrect identification of an incoming speech utterance, means for decreasing, during speech recognition, the quality value of reference patterns associated with an incorrect identification of an incoming utterance, means for adding new reference patterns to said stored reference patterns during said speech recognition process in response to said correction actions for providing additional reference patterns for recognizing unknown speech input utterances, means for identifying a reference pattern having a minimum quality value associated therewith, means for determining whether the identified reference pattern has a deletion-inhibiting status, and means for deleting the identified reference pattern in the absence of said deletion-inhibition status.

* * * * *